United States Patent
Guo et al.

(10) Patent No.: US 10,339,683 B2
(45) Date of Patent: Jul. 2, 2019

(54) PERFORMANCE DIAGNOSTIC FOR VIRTUAL MACHINES

(71) Applicant: VMware, Inc., Palo Alto, CA (US)

(72) Inventors: Shugang Guo, Shanghai (CN); Zhongping Lu, Shanghai (CN); Jin Feng, Shanghai (CN); Yixiang Zhang, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 307 days.

(21) Appl. No.: 14/862,163

(22) Filed: Sep. 23, 2015

(65) Prior Publication Data

US 2017/0084062 A1 Mar. 23, 2017

(51) Int. Cl.
*G06T 11/20* (2006.01)
*G06F 7/08* (2006.01)
*G06F 17/24* (2006.01)

(52) U.S. Cl.
CPC ............. *G06T 11/206* (2013.01); *G06F 7/08* (2013.01); *G06F 17/243* (2013.01)

(58) Field of Classification Search
CPC ........ G06T 11/206; G06F 7/08; G06F 17/243; G06F 17/60
USPC ................ 702/179; 705/35, 39, 38
See application file for complete search history.

(56) References Cited

U.S. PATENT DOCUMENTS

| | | |
|---|---|---|
| 6,907,404 B1 | 6/2005 | Li |
| 7,599,867 B1 | 10/2009 | Monroe et al. |
| 2007/0198802 A1* | 8/2007 | Kavuri ................. G06F 3/0605 711/170 |
| 2009/0319585 A1* | 12/2009 | Gokhale ........... G06F 17/30902 |
| 2010/0333116 A1* | 12/2010 | Prahlad ............ G06F 17/30082 719/328 |
| 2011/0239013 A1* | 9/2011 | Muller .................. G06F 1/3221 713/320 |
| 2015/0363270 A1* | 12/2015 | Hammer ............. G06F 11/1451 711/162 |

\* cited by examiner

*Primary Examiner* — Dzung Tran
(74) *Attorney, Agent, or Firm* — Su IP Consulting

(57) ABSTRACT

A method for a processor to provide a chart of a performance metric in a collection interval includes creating regions by dividing the collection interval into regions of increasingly smaller time intervals and determining a mean and a variance for each region based on data points in that region, sorting the regions by their variances and means, and processing the sorted regions. Processing the sorted regions includes removing any child region when its parent region has a variance that substantially represents the child region, and replacing any two neighboring or intersecting regions with a merged region comprising the two neighboring or intersecting regions when the merged region has a variance that substantially represents the two neighboring or intersecting regions. The method further includes generating the chart by visually indicating highest ranking regions by variance in the chart and displaying the chart or transmitting the chart over a computer network.

10 Claims, 12 Drawing Sheets

PERFORMANCE DIAGNOSTIC FOR VIRTUAL MACHINES

BACKGROUND

Virtualization allows the abstraction of hardware resources and the pooling of these resources to support multiple virtual machines. For example, through virtualization, virtual machines with different operating systems may be run on the same physical machine. Each virtual machine is generally provisioned with virtual resources that provide similar functions as the physical hardware of a physical machine, such as central processing unit (CPU), memory and network resources to run an operating system and different applications.

DETAILED DESCRIPTION

Figure 1:
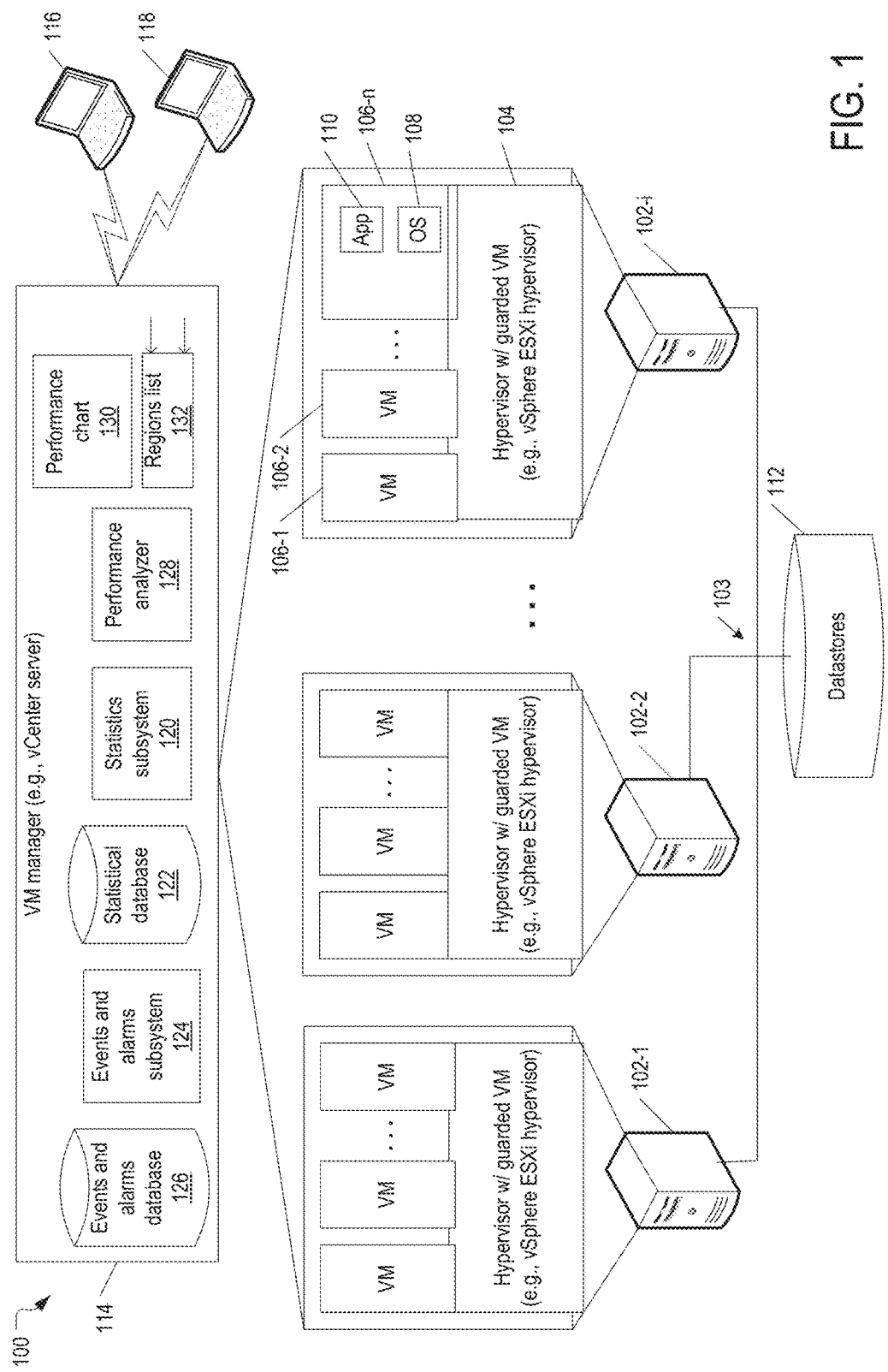
FIG. 1 is a block diagram illustrating a simplified view of a virtual machine (VM) system in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 is a block diagram illustrating a simplified view of a virtual machine (VM) system 100 in examples of the present disclosure. VM system 100 may be a VMware® datacenter. VM system 100 includes host computers 102-1, 102-2 . . . 102-i (collectively as "hosts 102" or as a generic individual "host 102"). Hosts 102 are coupled to each other through a network 103. Host 102-i includes physical memory, processor, and network interface cards (NICs). Host 102-i runs a hypervisor 104 that creates and runs VMs 106-1, 106-2 . . . 106-n (collectively as "VMs 106" or as a generic individual "VM 106"). Hypervisor 104 may be a VMware vSphere® hypervisor. VM 106-n includes virtualized memory and processor that executes a guest operating system (OS) 108 and one or more applications 110, and virtualized NICs that communicate with other VMs. Host 102-i is coupled directly or by network 103 to datastores 112, which provide storage locations for virtual machine files. Other VMs 106 may be similarly configured as VM 106-n, and other hosts 102 may be similarly configured as host 102-i. A number of hosts 102 and their associated VMs 106 may form a cluster that work together as a unit to provide high-availability and load balancing.

A VM manager 114 provides a user interface (UI) to centrally provision and manage virtual and physical objects in VM system 100, such as VMs 106, clusters, and hosts. VM manager 114 may include a web client that allows an administrators and VM owners to manage the objects from a browser. For example, an administrator uses a computer 116 and a VM owner uses a computer 118 to remotely access VM manager 114 to provision and manage the objects. Alternatively the administrator locally accesses the UI of VM manager 114 or a command-line interface (CLI) to hypervisor 104 to provision and configure the objects. VM manager 114 may run on one of hosts 102 or a separate host coupled by network 103 to hosts 102.

VM manager 114 includes a statistics subsystem 120 that collects statistical data on resource usage of the objects. The statistical data include CPU, memory, disk, network, host power, system, and VM operations metrics. Statistics subsystem 120 stores the statistical data in a log or database 122. The statistical data are accessed through command-line monitoring utilities or by viewing performance charts in the web client or the UI of VM manager 114. As used herein, the term "chart" may refer to any visual representation of mathematical quantities. A chart may be a table, a plot, a graph, or a diagram. A chart may represent the mathematical quantities as one or more columns, lines, pies, bars, areas, scattered points, surfaces, doughnuts, or bubbles.

A user sets a collection interval or archive length, which determines a collection frequency for which statistical data are aggregated, calculated, rolled up, and archived. In other words, the collection interval and the collection frequency determine how much statistical data are gathered. For a collection interval of 1 day with a collection frequency of 5 minutes, statistics subsystem 120 rolls up real-time statistics to create one data point every 5 minutes. The result is 12 data points every hour and 288 data points every day. For a collection interval of 1 week and a collection frequency of 30 minutes, statistics subsystem 120 rolls up the 1 day statistics to create one data point every 30 minutes. The result is 48 data points every day and 336 data points every week. The pattern may be repeated for longer collection levels and collection frequencies (e.g., 1 month collection interval with 2 hours collection frequency and 1 year collection interval with 1 day collection frequency).

VM manager 114 includes an events and alarms subsystem 124 that tracks events happening throughout VM system 100 and enables alarms triggered by events or conditions in the VM system. An event is a record of an action that occurs on an object. The action includes a license key expires, a VM is powered on, a user logs in to a VM, and a host connection is lost. Event data includes details about the event such as who or what generated it, when it occurred, and what type of event it is. An alarm is a notification that is activated in response to an event, a set of conditions, or the state of a host, a VM, or a cluster. An alarm definition may define an operation that occurs in response to a triggered alarm. Events and alarms subsystem 124 stores events and alarms data in a log or database 126. The events and alarms data are accessed through command-line monitoring utilities or by the web client or the UI of VM manager 114.

Although statistics subsystem 120 provides performance charts for various metrics, a user has to manually identify regions in a chart that show dramatic changes in value when compared to the rest of the chart (hereafter "regions of interest"). Even after identifying such regions of interest, the user has to manually find related events and alarms data in the same time period to determine what may have led to the changes in performance. This situation is exacerbated when the time interval of the performance chart is long.

In accordance with examples of the present disclosure, VM manager 114 includes a performance analyzer 128 that determines regions of interest in a chart 130 of a performance metric. These regions of interest in chart 130 have dramatic changes in value when compared to the rest of the chart. Performance analyzer 128 may act on statistical data of a single performance metric or a combination of performance metrics. For simplicity, performance analyzer 128 is first explained with a single performance metric and later with a combination of performance metrics.

Performance analyzer 128 uses mean and variance to determine regions of interest in chart 130. Mean is the average of a set of numbers. Variance is a statistical measure that indicates how far a set of numbers is spread out. Performance analyzer 128 first generates a list 132 of regions that span the collection interval of chart 130. Instead of having the same time interval, the regions have various time intervals and each region may be a parent, a child, or a neighbor to a number of other regions in list 132. Performance analyzer 128 calculates mean and variance for each region based on the statistical data of chart 130, and sorts the regions in list 132 by variance and then by mean. Performance analyzer 128 merges and prunes the sorted regions in list 132 based on their variance, and selects a number of highest ranking regions with high variance as the regions of interest.

Figure 2:
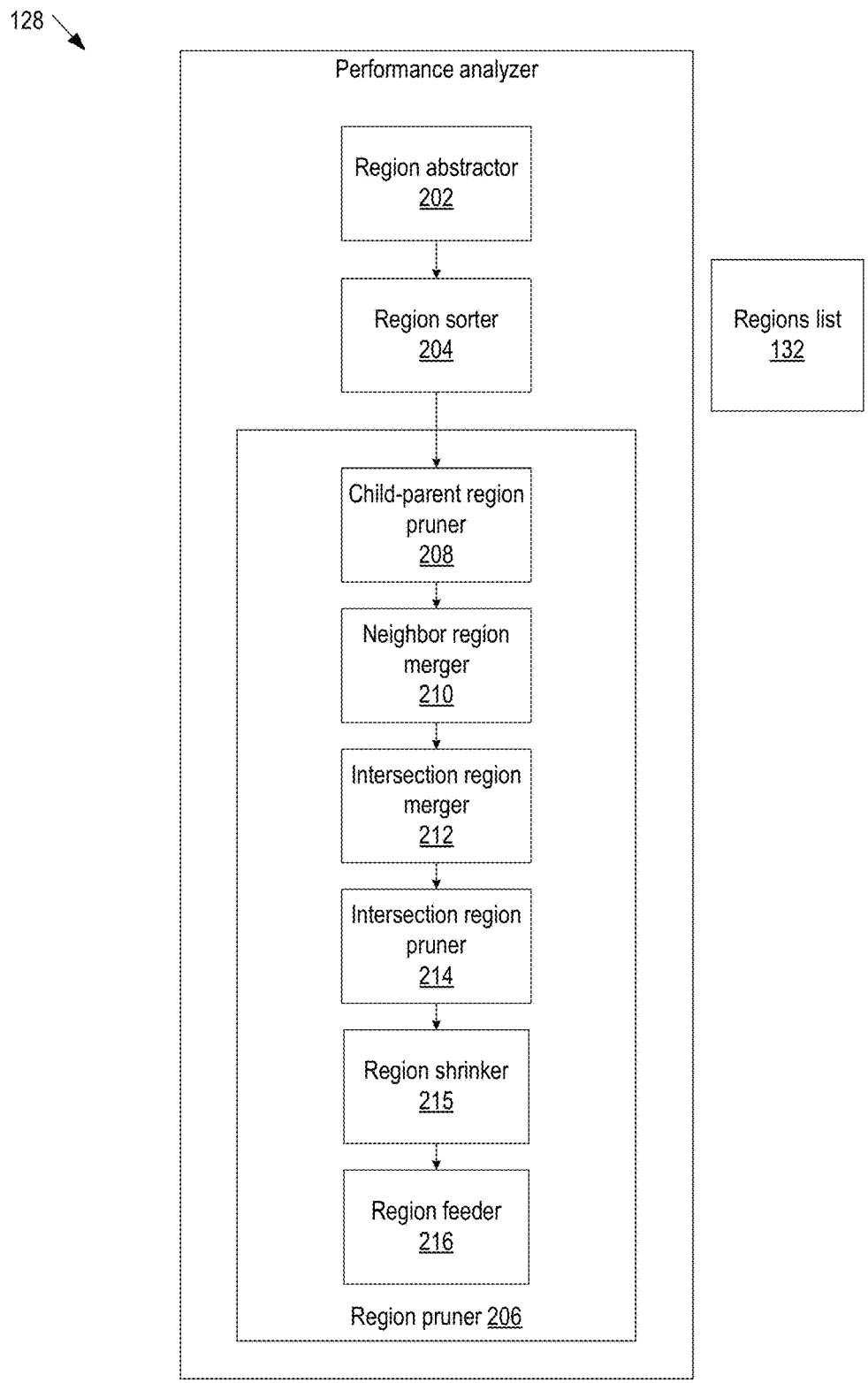
FIG. 2 is a block diagram of a performance analyzer of FIG. 1 in examples of the present disclosure.

FIG. 2 is a block diagram of performance analyzer 128 in examples of the present disclosure. Performance analyzer 128 includes a region abstractor 202, a region sorter 204, and a region pruner 206.

Region abstractor 202 generates a list 132 of regions that span from the collection interval of a chart 130 of a performance metric. Region abstractor 202 creates ever smaller regions so that overall the regions have a range of time intervals. Each region is an item that includes (1) its time interval and (2) its mean and variance calculated from the data points of the performance metric in the corresponding time period. Details of region abstractor 202 are explained later in reference to FIG. 3.

Region sorter 204 sorts the regions in list 132 received from region abstractor 202. Region sorter 204 first sorts the regions by variance and then by mean. Details of region sorter 204 are explained later in reference to FIG. 4.

Region pruner 206 prunes and merges the regions in sorted list 132 received from region sorter 204. For child-parent regions that have similar variance, region pruner 206 may preserve the parent region and remove the child region. For two (non-overlapping) neighboring regions that have similar variance, region pruner 206 may merge the regions to create a new region and remove the old regions. The pruning and merging may result in partially overlapping regions. For partially overlapping regions that have similar variance, region pruner 206 may merge the regions to create a new region and remove the old regions. For data points from removed regions that border a neighboring region, region pruner 206 may add the data points to the region when the data points increase the variance of the region.

Region pruner 206 includes a child-parent region pruner 208, a neighbor region merger 210, an intersection region merger 212, an intersection region pruner 214, a region shrinker 215, and a region feeder 216. Child-parent pruner 208 prunes regions that have child-parent relationships. Details of child-parent pruner 208 are described later in reference to FIG. 6. Neighbor region merger 210 merges regions that are adjacent but not partially overlapping in time. Details of neighbor region merger 210 are described later in reference to FIG. 7. Intersection region merger 212 merges regions that have child-parent relationships or partially overlap in time. Details of intersection merger 212 are described later in reference to FIG. 8. Intersection region pruner 214 prunes regions that partially overlap in time. Details of intersect region pruner 214 are described later in reference to FIG. 9. Region shrinker 215 removes points from the borders of the regions. Details of region shrinker 215 are described later in reference to FIG. 10. Region feeder 216 feeds data points from removed regions to neighboring regions. Details of region feeder 216 are described later in reference to FIGS. 11 and 12.

Figure 3:
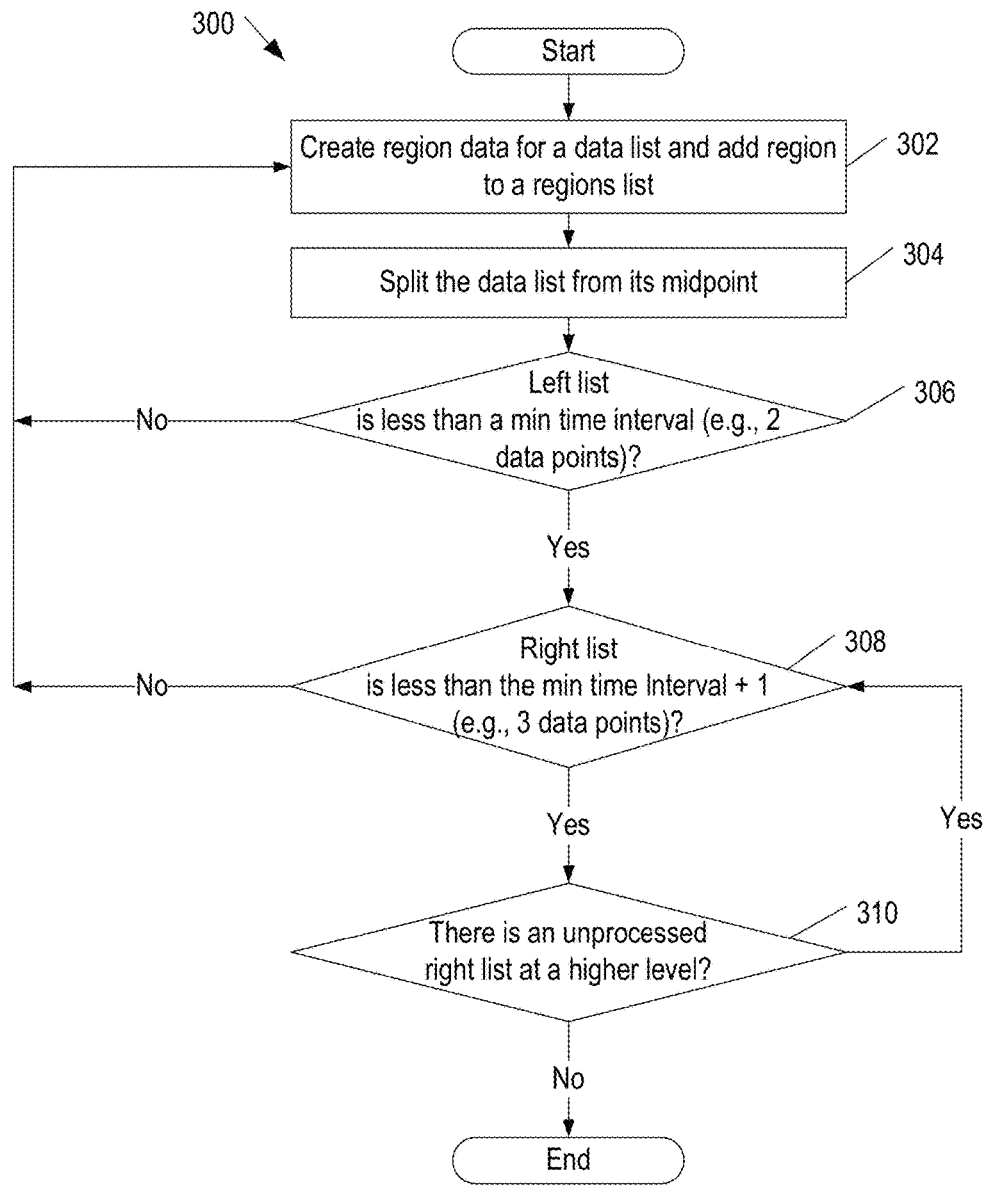
FIG. 3 is a flowchart of a method performed by a region abstractor of FIG. 2 to generate a regions list in examples of the present disclosures.

FIG. 3 is a flowchart of a method 300 performed by region abstractor 202 (FIG. 2) to generate a regions list 132 (FIG. 2) in examples of the present disclosures. Method 300 may be executed by a processor of a host executing computer readable codes of region abstractor 202. Method 300 may begin with block 302.

In block 302, region abstractor 202 creates a region for a data list and adds the region to regions list 132. A region is an item that includes (1) a time interval and (2) its mean and variance calculated from the data points of the performance metric in the corresponding time period. In some examples of the present disclosure, the time interval is denoted by [A, B) where interval start point A and interval endpoint B are integers that represent data points by their sequential orders. For example, a time interval [0, 6) indicates there are 6 data points represented by their sequential orders 0, 1, 2, 3, 4, and 5 and time interval [0, 6) spans from the first data point 0 to the sixth data point 5 but does not include any further data point. Block 302 may be followed by block 304.

In block 304, region abstractor 202 splits the data list at its midpoint to create a left data list and a right data list. The two lists are continuous so the left data list ends at a data point that beings the right data list (i.e., the last data point in the left data list is the first data point in the right data list).

For example, a data list with a time interval [0, 6] is divided into a left data list with a time interval [0, 3) and a right data list [2, 6) so the left data list ends at data point 2 and the right list starts at data point 2. If a data list cannot be split evenly, region abstractor 202 gives the extra data point to the left data list so they are substantially equal. Block 304 may be followed by block 306.

In block 306, region abstractor 202 determines if the left data list is smaller than a threshold (e.g., 2 data points). If so, block 306 may be followed by block 308. Otherwise block 306 may loop back to block 302 to create a new region for the left data list.

In block 308, region abstractor 202 determines if the right data list is smaller than the threshold plus one (e.g., 3 data points) where the added one to the threshold accounts for the fact that right list includes the endpoint of the left list. If so, block 308 may be followed by block 310. Otherwise block 306 may loop back to block 302 to create a new region for the right data list.

In block 310, region abstractor 202 determines if there is a right data list in an upper level that has not been processed. If so, block 310 may loop back to block 308. Otherwise method 300 may end.

Figure 4:
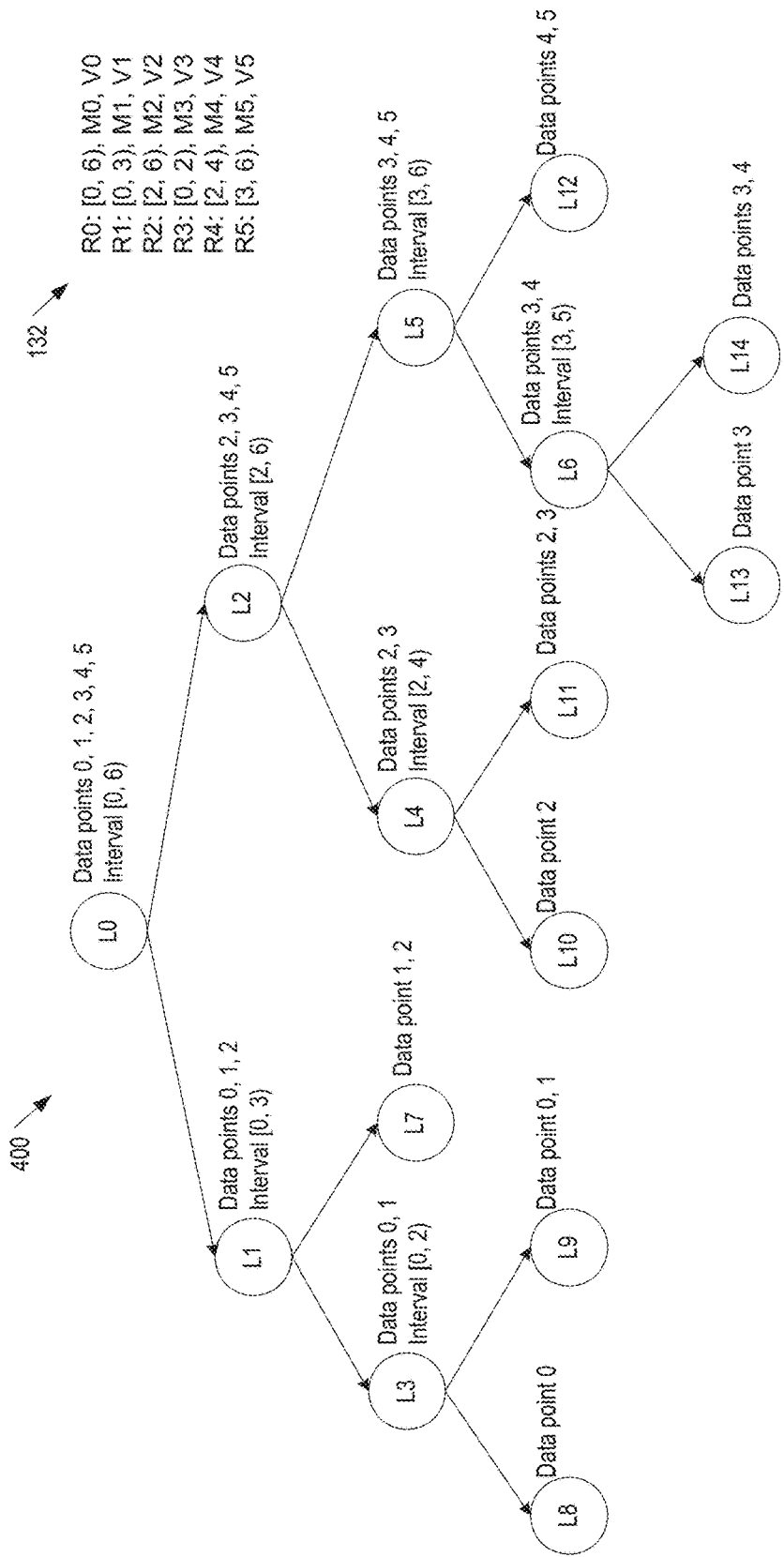
FIG. 4 illustrates a lists tree used by region abstractor of FIG. 2 to create a regions list according to the method of FIG. 3 in examples of the present disclosure.

FIG. 4 illustrates a lists tree 400 used by region abstractor 202 (FIG. 2) to create a regions list 132 according to method 300 (FIG. 3) in examples of the present disclosure. Assume an original data list L0 includes 6 performance data points represented by their sequential orders 0, 1, 2, 3, 4, and 5 with a time interval [0, 6).

Region abstractor 202 creates a first region R0 from data list L0. Region R0 has time interval [0, 6) and mean, variance calculated from its data points. Region abstractor 202 splits original data list L0 into a left data list L1 with data points 0, 1, 2 and a right data list L2 with data points 2, 3, 4, 5. Note that right data lists' interval start point is 2 so it is continuous with the counterpart left data list. As left data list L1 is not less than the minimum time interval (e.g., 2 data samples), region abstractor 202 creates a region R1 with time interval [0, 3) and mean, variance calculated from its data points and adds it to regions list 132.

Region abstractor 202 splits list L1 into a left data list L3 with data points 0, 1 and a right data list L7 with data points 1, 2. As left list data L3 is not less than the minimum time interval, region abstractor 202 creates a region R3 with time interval [0, 2) and mean, variance calculated from its data points and adds it to list 132.

Region abstractor 202 splits data list L3 into a left data list L8 with a data point 0 and a right data list L8 with data points 0, 1. As data left data list L8 is less than the minimum time interval and right data list L9 is less than the minimum time interval plus one (e.g., 3 data samples), regions are not created and they are not further split.

Region abstractor 202 looks for an unprocessed right data list at a higher level and finds right data list L7. As right data list L7 is less than the minimum time interval plus one, region abstractor 202 looks for another unprocessed right data list at a higher level and find right data list L2.

As right list data L2 is not less than the minimum time interval plus one, region abstractor 202 creates a region R2 with time interval [2, 6) and mean, variance calculated from its data points and adds it to list 132.

Region abstractor 202 splits data list L2 into a left data list L4 with data points 2, 3 and a right data list with data points 3, 4, 5. Note that right data lists' interval start point is 3 so it is continuous with the counterpart left data list. As left data list L4 is not less than the threshold of 2 data samples, region abstractor 202 creates a region R4 with time interval [0, 2) and mean, variance calculated from its data points and adds it to regions list 132.

Region abstractor 202 splits data list L4 into a left data list L10 with a data point 2 and a right data list L11 with data points 2, 3. As data left data list L10 is less than the minimum time interval and right data list L11 is less than the minimum time interval plus one (e.g., 3 data samples), regions are not created and they are not further split.

Region abstractor 202 looks for an unprocessed right data list at a higher level and finds right data list L5. As left data list L5 is not less than the minimum time interval, region abstractor 202 creates a region R5 with time interval [3, 6) and mean, variance calculated from its data points and adds it to regions list 132.

Region abstractor 202 splits data list L5 into a left data list L6 with data points 3, 4 and a right list L12 with data points 4, 5. Note that right data lists' interval start point is 4 so it is continuous with the counterpart left data list. As left data list L6 is not less than the minimum time interval, region abstractor 202 creates a region R6 with time interval [3, 5) and mean, variance calculated from its data points and adds it to regions list 132.

Region abstractor 202 splits list L6 into a left data list L13 with a data point 3 and a right data list L14 with a data point 4. As data left data list L13 is less than the minimum time interval and right data list L14 is less than the minimum time interval plus one (e.g., 3 data samples), regions are not created and they are not further split.

Region abstractor 202 looks for an unprocessed right data list at a higher level and finds right data list L12. As right data list L12 is less than the minimum time interval plus one (e.g., 3 data samples), region abstractor 202 does not create a region.

Figure 5:
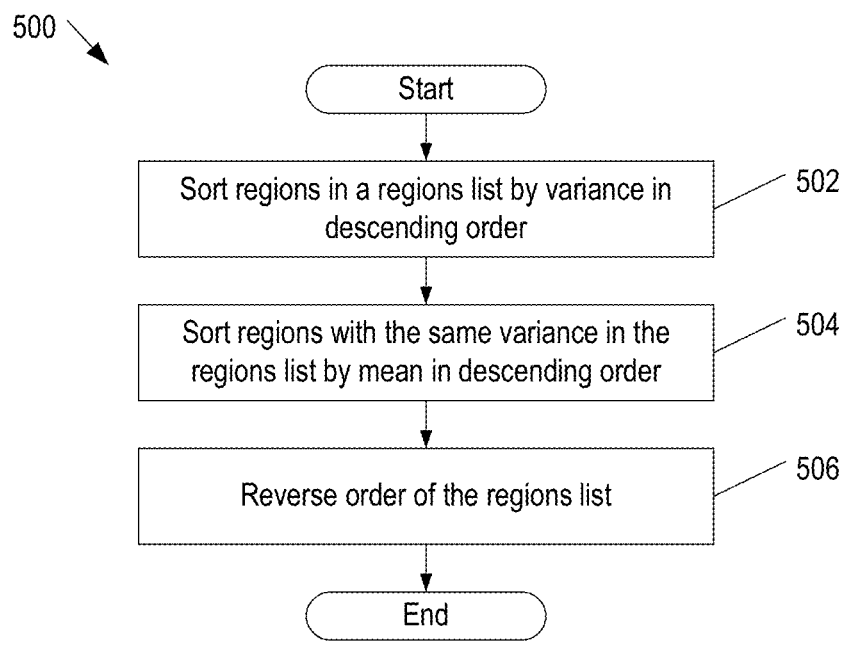
FIG. 5 is a flowchart of a method performed by a region sorter of FIG. 2 to the sort the regions list generated by the region abstractor of FIG. 2 in examples of the present disclosures.

FIG. 5 is a flowchart of a method 500 performed by region sorter 204 (FIG. 2) to sort regions list 132 (FIG. 2) generated by region abstractor 202 (FIG. 2) in examples of the present disclosures. Method 500 may be executed by a processor of a host executing computer readable codes of region sorter 204. Method 500 may begin with block 502.

In block 502, region sorter 204 sorts the regions by variance in descending order. Alternatively region sorter 204 may also sort the regions by variance in ascending order. Block 502 may be followed by block 504.

In block 504, region sorter 204 sorts the regions with the same variance in regions list 132 by mean in descending order. Block 504 may be followed by optional block 506.

In optional block 506, region sorter 206 reverses the order of regions list 132 because pruning and merging regions in regions list 132 may be easier in ascending order. Method 500 may end after block 506.

Figure 6:
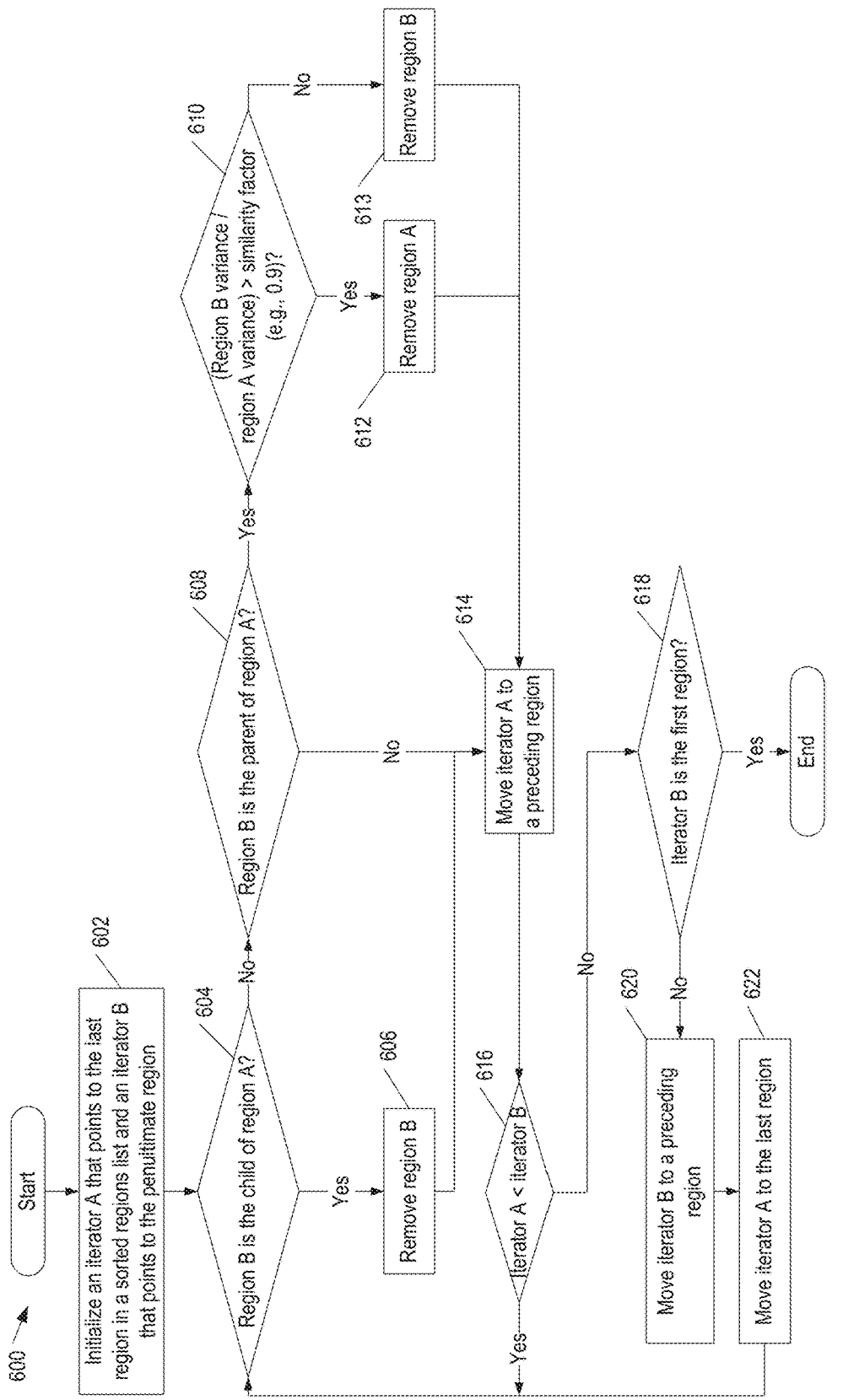
FIG. 6 is a flowchart of a method performed by a child-parent region pruner of FIG. 2 to prune child-parent regions in the sorted region list after in examples of the present disclosures.

FIG. 6 is a flowchart of a method 600 performed by child-parent region pruner 208 (FIG. 2) to prune the sorted regions list 132 (FIG. 2) after sorting by region sorter 206 (FIG. 2) in examples of the present disclosures. Child-parent region pruner 208 preserves a parent region and removes its child region when they have similar variance.

Method 600 may be executed by a processor of a host executing computer readable codes of child-parent region pruner 208. Method 600 may begin with block 602.

In block 602, child-parent region pruner 208 initializes an iterator A that points to the last region of the sorted regions list 132, and an iterator B that points to the penultimate region in the sorted regions list. The region referenced by iterator A is referred to as "region A" while the region referenced iterator B is referred to as "region B." Block 602 may be followed by block 604.

In block 604, child-parent region pruner 208 determines if region B is a child of region A based on their time interval. For example, region B is a child of region A when they share an interval endpoint and the time interval of region B is at least half but less than the time interval of region A. Alternatively their hierarchy is directly recorded in lists tree 400 (FIG. 4) or with the regions in the sorted regions list 132. If so, block 604 maybe followed by block 606. Otherwise block 604 may be followed by block 608.

In block 606, child-parent region pruner 208 removes child region B from the sorted regions list 132 because parent region A includes child region B and parent region A has a larger variance than child region B. When child region B is removed, iterator B will point to the preceding region. Block 606 may be followed by block 614.

In block 608, child-parent region pruner 208 determines if region B is a parent of region A based on their time interval. For example, region B is a parent of region A when they share an interval endpoint and the time interval of region A is at least half but less than the time interval of region B. Alternatively their hierarchy is directly recorded in lists tree 400 (FIG. 4) or with the regions in the sorted regions list 132. If so, block 608 may be followed by block 610. Otherwise block 608 may be followed by block 614.

In block 610, child-parent region pruner 208 determines if parent region B substantially represents child region A. A parent region B substantially represents a child region A even though parent region B has a smaller variance than child region A when they have similar variance. Child region A and parent region B have similar variance when the ratio of parent region B variance to child region A variance is greater than a similarity factor (e.g., 0.9). If so, block 610 may be followed by block 612. Otherwise block 610 may be followed by block 613.

In block 612, child-parent region pruner 208 removes child region A from the sorted regions list 132 because parent region B includes child region A and substantially represents child region A. When child region A is removed, iterator A will point to the preceding region in the sorted regions list 132. Block 612 may be followed by blocks 614 to 622, which are used to traverse the sorted regions list 132.

In block 613, child-parent region pruner 208 removes parent region B from the stored regions list 132 because parent region B does not substantially represent child region A. When parent region B is removed, iterator B will point to the preceding region in the sorted regions list 132. The data points that are in parent region B but not child region A are freed so they may be later added back to another region. Block 613 may be followed by block 614.

Blocks 614 to 622 are used by child-parent region pruner 208 to traverse the sorted regions list 132. Essentially child-parent region pruner 208 starts from the penultimate region in the sorted regions list 132, which is in ascending order, and compares that region against all regions below it. Child-parent region pruner 208 then moves up one region on the sorted regions list 132 and compare that region against all regions below it, and the process is repeated until the child-parent region pruner reaches the top of the sorted regions list.

In block 614, child-parent region pruner 208 determines if iterator A is smaller than iterator B (i.e., region A is below region B in the sorted regions list 132). If so, block 614 may be followed by block 616. Otherwise block 614 may be followed by block 618.

In block 616, child-parent region pruner 208 moves iterator A to the preceding region in the sorted regions list 132. Block 616 may loop back to block 604 to repeat the above described process.

In block 618, child-parent region pruner 208 determines if iterator B points to the first region in the sorted regions list 132 (i.e., region B has reached the top of the sorted regions list). If so, method 600 may end. Otherwise block 618 may be followed by block 620.

In block 620, child-parent region pruner 208 moves iterator B to the preceding block in the sorted regions list 132 (i.e., moves region B up one on the sorted regions list). Block 620 may be followed by block 622.

In block 622, child-parent region pruner 208 moves iterator A to the last region in the sorted regions list 132. Block 622 may loop back to block 604 to repeat the above described process.

Figure 7:
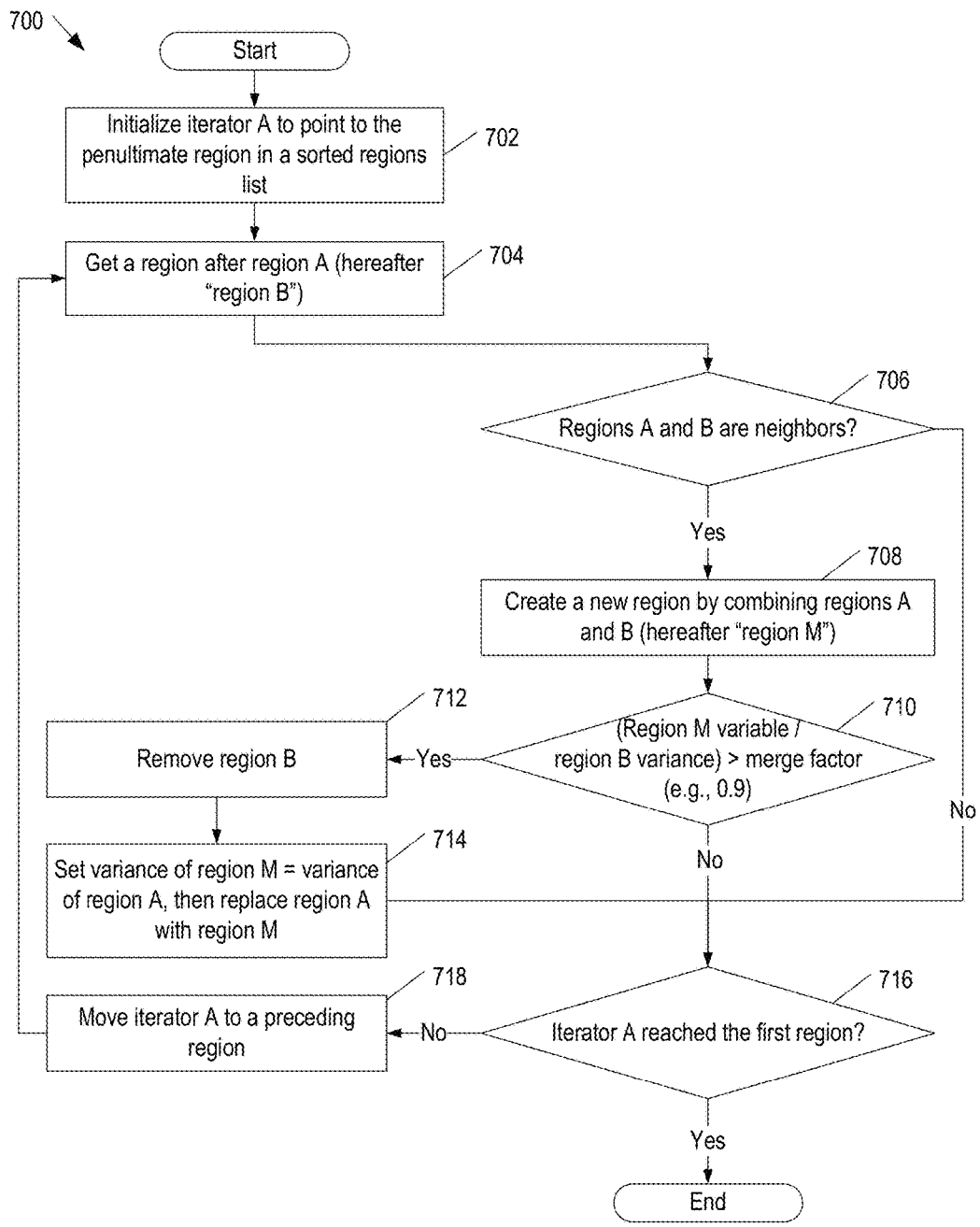
FIG. 7 is a flowchart of a method performed by a neighbor region merger of FIG. 2 to merge neighboring regions in the sorted regions list in examples of the present disclosures.

FIG. 7 is a flowchart of a method 700 performed by neighbor region merger 210 (FIG. 2) to merge selected regions in the sorted regions list 132 (FIG. 2) after pruning by child-parent region pruner 208 (FIG. 2) in examples of the present disclosures. Neighbor region merger 210 merges two (non-overlapping) neighbor regions when the resulting merged region and the one neighbor region with the higher variance have similar variance.

Method 700 may be executed by a processor of a host executing computer readable codes of neighbor region merger 210. Method 700 may begin with block 702.

In block 702, neighbor region merger 210 initializes an iterator A that points to the penultimate region of the sorted regions list 132. The region referenced by iterator A is referred to as "region A." Block 702 may be followed by block 704.

In block 704, neighbor region merger 210 gets a region after region A in the sorted regions list 132, which is referred to as "region B." Block 704 may be followed by block 706.

In block 706, neighbor region merger 210 determines if regions A and B are neighbors based on their time intervals. For example, regions A and B are neighbors when the interval start point of one and the interval endpoint of the other are consecutive so they are one data point. Alternatively their hierarchy is directly recorded in lists tree 400 (FIG. 4) or with the regions in the sorted regions list 132. If so, block 706 may be followed by block 708. Otherwise block 706 may be followed by block 716 and 718, which are used to traverse the sorted regions list 132.

In block 708, neighbor region merger 210 creates a new region M by combining regions A and B. New region M includes (1) its time interval and (2) its mean and variance calculated from the data points of the performance metric in the corresponding time periods of regions A and B. Block 708 may be followed by block 710.

In block 710, neighbor region merger 210 determines if new region M substantially represents both constituent regions A and B. A new region M substantially represents constituent regions A and B even though new region M has a smaller variance than constituent region B when they have similar variance. New region M and constituent region B have similar variance when the ratio of new region M variance to constituent region B variance is greater than a similarity factor (e.g., 0.9). If so, block 710 may be followed by block 714. Otherwise block 710 may be followed by block 716 and 718, which are used to traverse the sorted regions list 132. Note that variance for new region M may be determined based on actual data points in constituent regions A and B or from the variances of regions A and B.

In block 714, neighbor region merger 210 sets the variance of new region M equal to the variance of constituent region B, removes constituent region B from the sorted regions list 132, and replaces constituent region A with new region M in the sorted region lit 132. Variance of new region M is set to the variance of constitute region B to ensure further mergers of neighboring regions can maintain if not increase the variance of the resulting regions. Block 714 may be followed by blocks 716 and 718, which are used to traverse the sorted regions list 132.

In block 716, neighbor region merger 210 determines if iterator A has reached the first region in sorted regions list 132. If so, method 700 may end. Otherwise block 716 may be followed by block 718.

In block 718, neighbor region merger 210 moves iterator A to the preceding region in the sorted regions list 132. Block 718 may loop back to block 704 to repeat the above described process.

Figure 8:
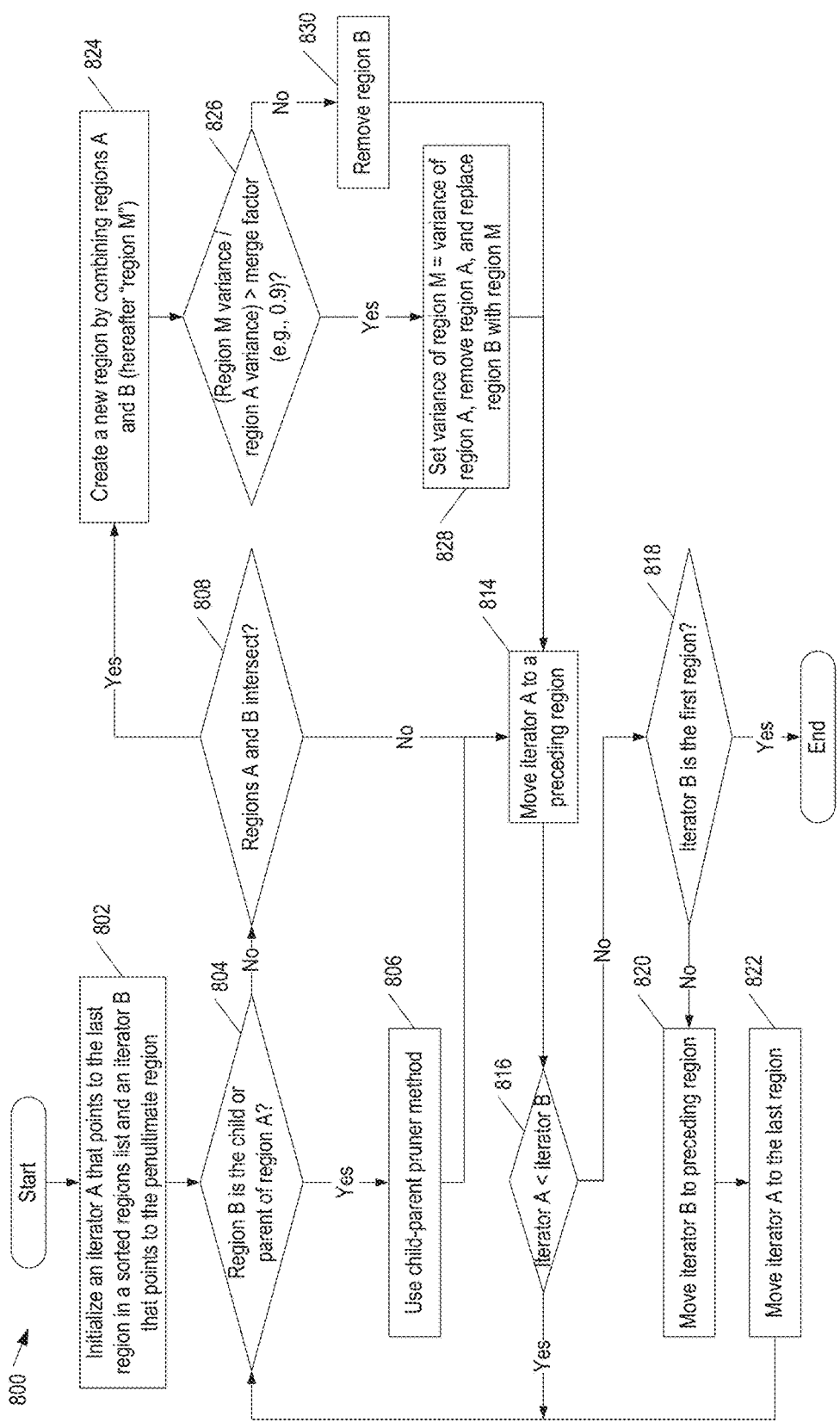
FIG. 8 is a flowchart of a method performed by an intersection region merger of FIG. 2 to merge intersecting regions in the sorted regions list in examples of the present disclosures.

FIG. 8 is a flowchart of a method 800 performed by intersection region merger 212 (FIG. 2) to prune and merge selected regions in the sorted regions list 132 (FIG. 2) after merging by neighbor region merger 210 (FIG. 2) in examples of the present disclosures. Due to the pruning in method 600 (FIG. 6) and the merger in method 700 (FIG. 7), new child-parent relationships and partially overlapping relationships are formed between the regions in the sorted regions list 132. Intersection region merger 212 may prune the new child-parent regions and merges the new partially overlapping regions.

Method 800 may be executed by a processor of a host executing computer readable codes of intersect region merger 212. Method 800 may begin with block 802.

In block 802, intersection region merger 212 initializes an iterator A that points to the last region of the sorted regions list 132, and an iterator B that points to the penultimate region in the sorted regions list. The region referenced by iterator A is referred to as "region A" while the region referenced iterator B is referred to as "region B." Block 802 may be followed by block 804.

In block 804, intersection region merger 212 determines if region B is a child or parent of region A based on their time intervals. If so, block 804 maybe followed by block 806. Otherwise block 804 may be followed by block 808.

In block 806, intersection region merger 212 applies the child-parent pruner method of blocks 604 to 613 (FIG. 6) to determine if either region A or B should be removed. Block 806 may be followed by blocks 814 to 822, which are used to traverse the sorted regions list 132. As blocks 814 to 822 correspond to blocks 614 to 622, their description is skipped for the sake of brevity.

In block 808, intersection region merger 212 determines if regions A and B intersect (partially overlap) in time based on their time intervals. For example, regions A and B intersect when the time interval endpoint of one region is greater by two or more than the time interval start point of the other region so the two regions share more than one data point but are not in a child-parent relationship. Alternatively their hierarchy is directly recorded in lists tree 400 (FIG. 4) or with the regions in the sorted regions list 132. If so, block 808 may be followed by block 824. Otherwise block 808 may be followed by 814 to 822, which are used to traverse the sorted regions list 132.

In block 824, intersection region merger 212 creates a new region M by combining regions A and B. New region M includes (1) its time interval and (2) its mean and variance calculated from the data points of the performance metric in the corresponding time periods of regions A and B. Note that new region M has a variance lower than constituent region A but higher than constituent region B. Block 824 may be followed by block 826.

In block 826, intersection region merger 212 determines if new region M substantially represents constituent regions A and B. A new region M substantially represents constituent regions A and B even though new region M has a smaller variance than constituent region A when they have similar variance. New region M and constituent region A have similar variance when the ratio of new region M variance to constituent region A variance is greater than a merge factor (e.g., 0.9). If so, block 826 may be followed by block 828. Otherwise block 826 may be followed by block 830. Note that variance for new region M may be determined based on actual data points in constituent regions A and B or from the variances of regions A and B.

In block 828, intersection region merger 212 sets the variance of new region M equal to the variance of constituent region A, removes constituent region A from the sorted regions list 132, and replaces constituent region B with new region M in the sorted region lit 132. Variance of new region M is set to the variance of constitute region A to ensure further mergers of intersecting regions can maintain if not increase the variance of the resulting regions. Block 828 may be followed by blocks 814 to 822, which are used to traverse the sorted regions list 132.

In block 830, intersection region merger 212 removes constituent region B from the sorted regions list 132 because new region M includes constituent region B and has a higher variance than constituent region B. When region B is removed, iterator B will point to the preceding region in the sorted regions list 132. Block 830 may be followed by blocks 814 to 822, which are used to traverse the sorted regions list 132.

Figure 9:
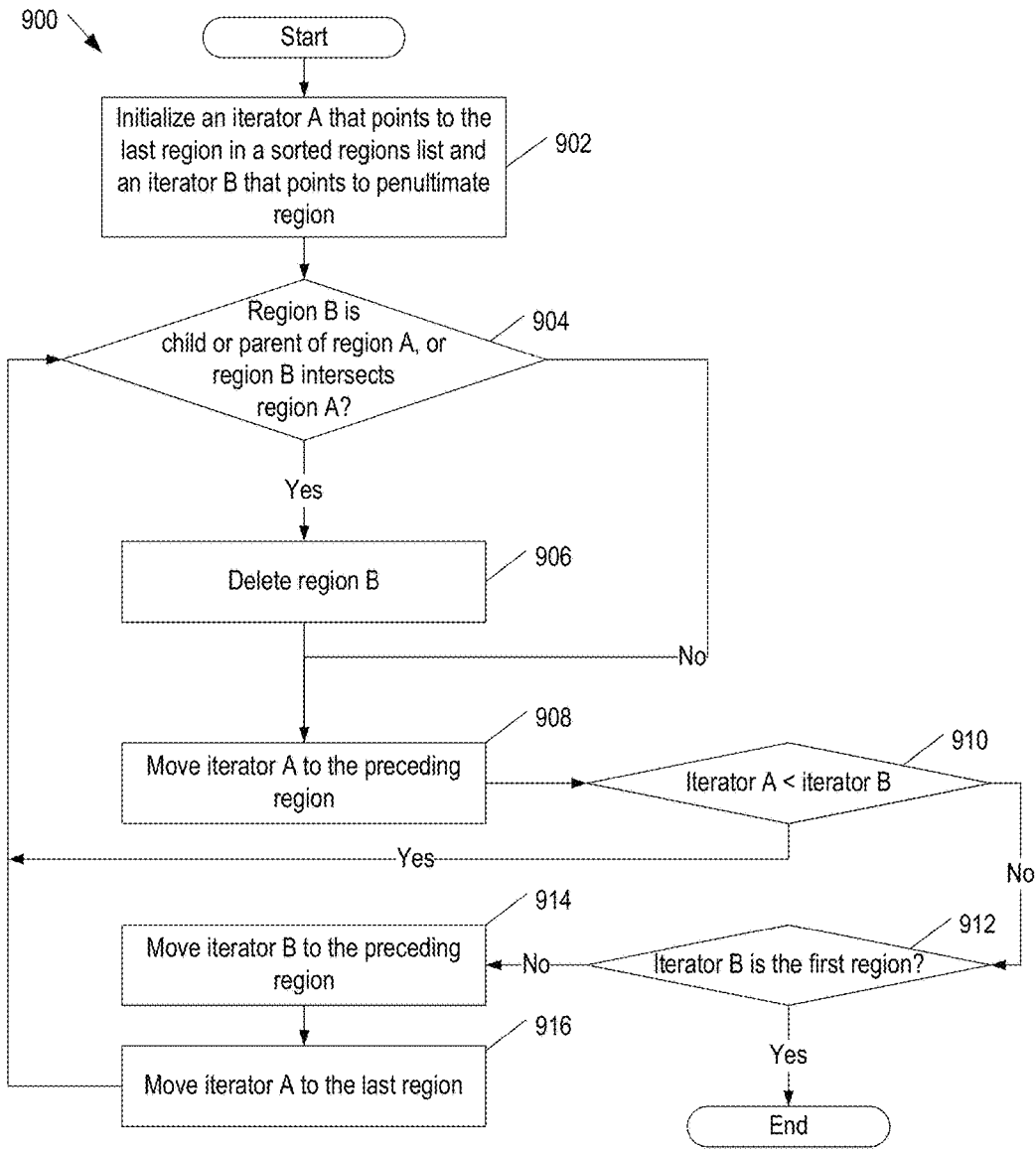
FIG. 9 is a flowchart of a method performed by an intersection region pruner of FIG. 2 to prune intersecting regions in the sorted regions list in examples of the present disclosures.

FIG. 9 is a flowchart of a method 900 performed by intersection region pruner 214 (FIG. 2) to prune the sorted regions list 132 (FIG. 2) after merging by intersection region merger 212 (FIG. 2) in examples of the present disclosures. For a pair of regions that are in a child-parent or partially overlapping (intersecting) relationship, intersection region pruner 214 removes the child, the parent, or the partially overlapping region that has the lower variance.

Method 900 may be executed by a processor of a host executing computer readable codes of intersection region pruner 214. Method 900 may begin with block 902.

In block 902, intersection region pruner 214 initializes an iterator A that points to the last region of the sorted regions list 132, and an iterator B that points to the penultimate region in the sorted regions list. The region referenced by iterator A is referred to as "region A" while the region referenced iterator B is referred to as "region B." Block 902 may be followed by block 904.

In block 904, intersection region pruner 214 determines if region B is a child or a parent of region A, or if region B intersects region A. If so, block 904 maybe followed by block 906. Otherwise block 904 may be followed by block 908.

In block 906, intersection region pruner 214 removes region B from the sorted regions list 132 because region A has higher variance than region B. When region B is removed, iterator B will point to the preceding region in the sorted regions list 132. The data points that are in region B but not region A are freed so they may be later added back to another region. Block 906 may be followed by blocks 908 to 916, which are used to traverse the sorted regions list 132. As blocks 908 to 916 correspond to blocks 614 to 622, their description is skipped for the sake of brevity.

Figure 10:
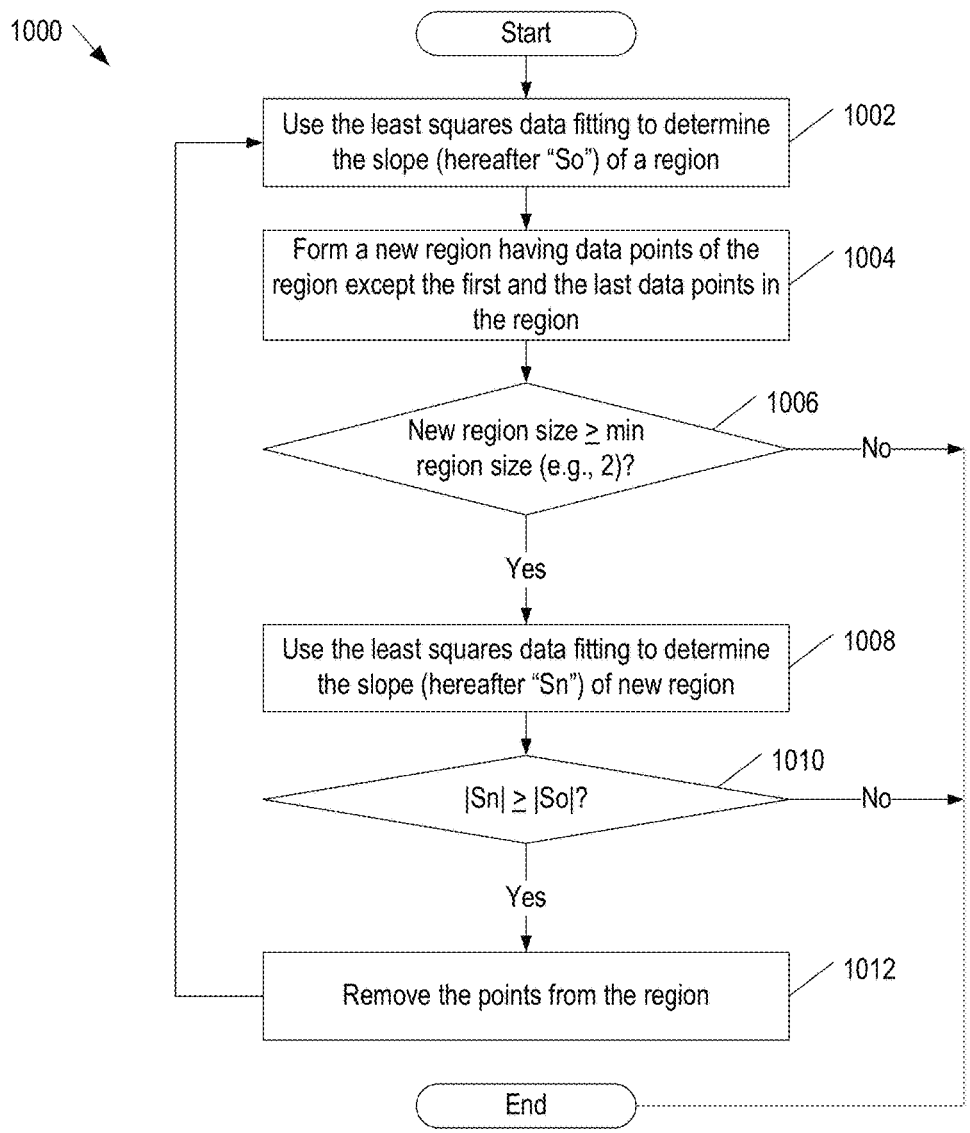
FIG. 10 is a flowchart of a method performed by a region shrinker of FIG. 2 to shrink regions in the sorted regions list in examples of the present disclosure.

FIG. 10 is a flowchart of a method 1000 performed by region shrinker 215 (FIG. 2) to remove data points from a region in examples of the present disclosures. Region shrinker 215 removes points from the ends of the region when their removal does not decrease the variance of the region.

Method 1000 may be executed by a processor of a host executing computer readable codes of region shrinker 215. Region shrinker 215 may apply method 1000 to each region in the sorted regions list 132 (FIG. 2) after pruning by intersection region pruner 214 (FIG. 2). Method 1000 may begin with block 1002.

In block 1002, region shrinker 215 determines the slope (hereafter "So") of a line that best fits the data points of the current region being processed in method 1000. Region shrinker 215 may use the least squares method to determine the slope So of the current region. Block 1002 may be followed by block 1004.

In block 1004, region shrinker 215 forms a new region that has all the data points of the current region that is being processes except the first and the last data points of the region. Block 1004 may be followed by block 1006.

In block 1006, region shrinker 215 determines if the size of the new region is greater than or equal to a minimum region size (e.g., 2 data points). If so, block 1006 may be followed by block 1008. Otherwise method 1000 may end.

In block 1008, region shrinker 215 determines the slope (hereafter "Sn") of a line that best fits the data points of the new region. Region shrinker 215 may use the least squares method to determine the slope Sn of the new region. Block 1008 may be followed by block 1010.

In block 1010, region shrinker 215 determines if the absolute value of So is greater or equal to the absolute value of Sn. If so, method 1000 may end. Otherwise block 1010 may be followed by block 1012.

In block 1012, region shrinker 215 removes the first and the last data points from the current region. Block 1012 may be followed by block 1002 to see if further points may be removed from the current region without reducing its variance.

Figure 11:
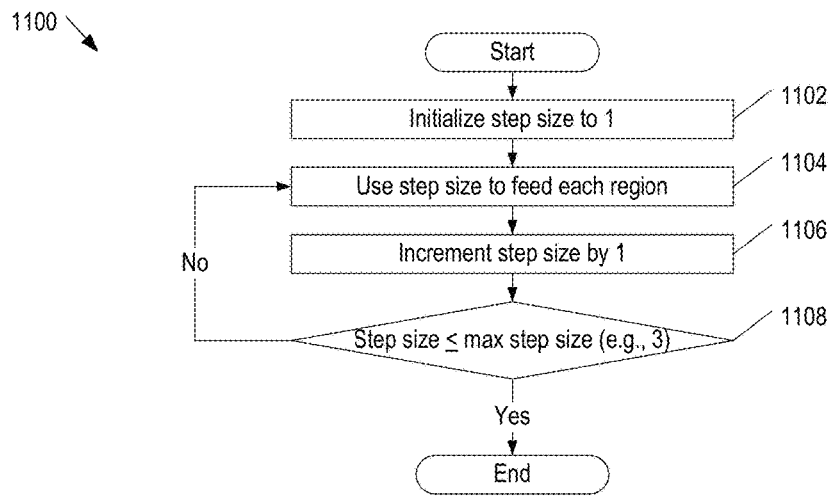
FIGS. 11 and 12 are flowcharts of methods performed by a region feeder of FIG. 2 to add outstanding data points to high ranking regions in the sorted regions list after shrinking by the region shrinker of FIG. 2 in examples of the present disclosures.

FIG. 11 is a flowchart of a method 1100 performed by region feeder 216 (FIG. 2) to add N (step size) outstanding data points to a high ranking region in the sorted regions list 132 (FIG. 2) after shrinking by region shrinker 215 (FIG. 2) in examples of the present disclosures. Outstanding data points are those that belong to regions that have been removed. These data points may be added to neighboring high ranking regions to increase their variance.

Method 1100 may be executed by a processor of a host executing computer readable codes of region feeder 216. Region feeder 216 may select a number (e.g., 6, 7, 9, or 10) of highest ranking regions in the sorted regions list 132 and apply method 1200 to each of them. Method 1100 may begin with block 1102.

In block 1102, region feeder 216 initializes step size N to 1. Block 1102 may be followed by block 1104.

In block 1104, region feeder 216 uses step size N to feed each high ranking region. Block 1104 is explained later in detail with reference to FIG. 12. Block 1104 may be followed by block 1106.

In block 1106, region feeder 216 increments step size N by 1. Block 1106 may be followed by block 1108.

In block 1108, region feeder 216 determines if the step size is less than or equal to a maximum step size. If so, method 1100 may end. Otherwise block 1108 loops back to block 1104 to use the incremented step size N to feed each high ranking region. The maximum step size may have a default value (e.g., 3) that is user adjustable.

Figure 12:
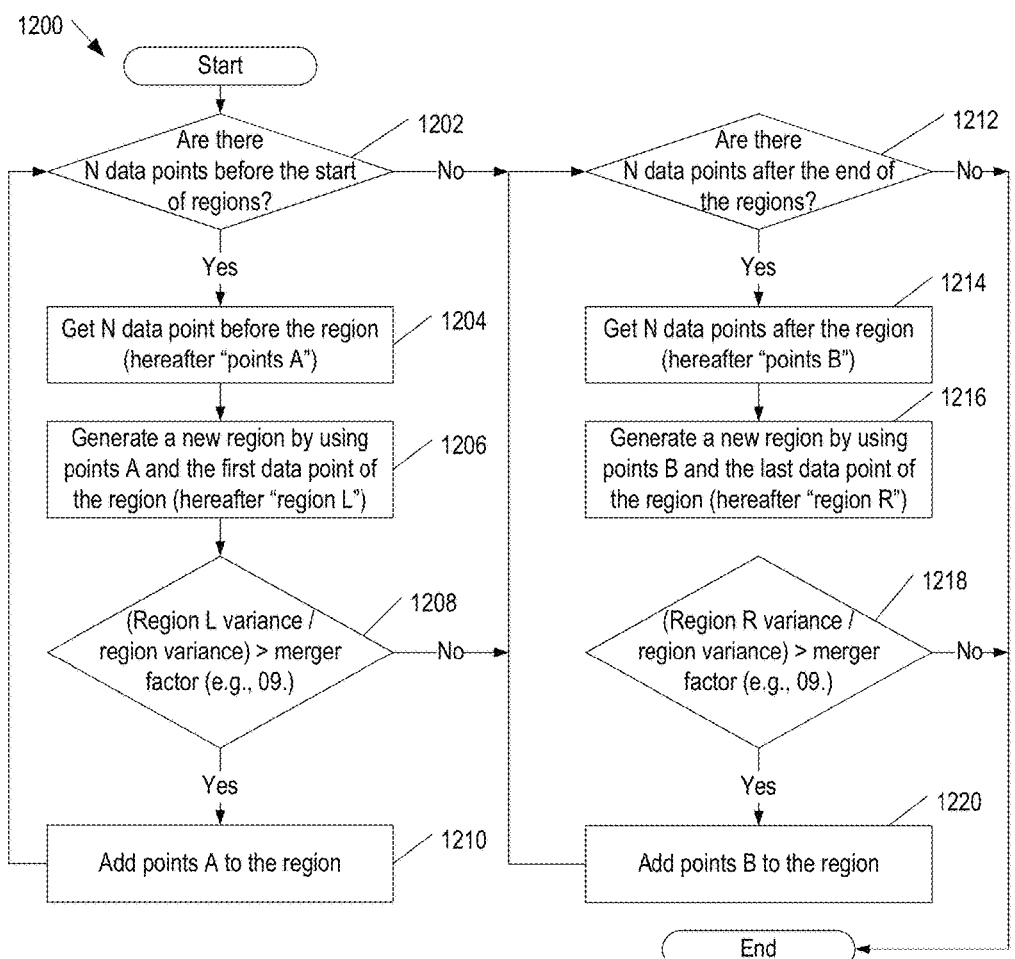

FIG. 12 is a flowchart of a method 1200 performed by region feeder 216 (FIG. 2) to implement block 1104 (FIG. 11) in examples of the present disclosures. Method 1200 may begin with block 1202.

In block 1202, region feeder 216 determines if there are N (the current step size) outstanding data points before the start of a high ranking region in the sorted regions list 132. If so, block 1202 may be followed by block 1204. Otherwise block 1202 may be followed by block 1212.

In block 1204, region feeder 216 gets N outstanding data points before the high ranking region (hereafter "points A"). Block 1204 may be followed by block 1206.

In block 1206, region feeder 216 generates a new region L having points A and the first data point from the statistical data in the corresponding time periods of the high ranking region. New region L includes (1) its time interval and (2) its mean and variance calculated from points A and the first data point from the statistical data in the corresponding time period of the high ranking region. Block 1206 may be followed by block 1208.

In block 1208, region feeder 216 determines if points A cause a significant variance compared to the high ranking region so points A should be included in the region. Points A cause a significant variance when the ratio of new region L variance to the high ranking region variance is greater than a merger factor (e.g., 0.9). If so, block 1208 may be followed by block 1210. Otherwise block 1208 may be followed by block 1212.

In block 1210, region feeder 216 adds points A to the high ranking region. Block 1210 may loop back to block 1202.

In block 1212, region feeder 216 determines if there are N outstanding data points after the end of the high ranking region in the sorted regions list 132. If so, block 1212 may be followed by block 1214. Otherwise method 1200 may end.

In block 1214, region feeder 216 gets N outstanding data points after the high ranking region (hereafter "points B"). Block 1214 may be followed by block 1216.

In block 1216, region feeder 216 generates a new region R having points B and the last data point from the statistical data in the corresponding time periods of the high ranking region. New region R includes (1) its time interval and (2) its mean and variance calculated from the points B and the last data point from the statistical data in the corresponding time period of the high ranking region. Block 1216 may be followed by block 1218.

In block 1218, region feeder 216 determines if points B cause a significant variance compared to the high ranking region so points B should be included in the region. Points B cause a significant variance when the ratio of new region R variance to the high ranking region variance is greater than the merger factor. If so, block 1218 may be followed by block 1220. Otherwise method 1200 may end.

In block 1220, region feeder 216 adds points B to the high ranking region. Block 1220 may loop back to block 1212.

The above methods have been described with regards to the input of a single type of performance data. In some examples of the present disclosure, two or more types of performance data may be combined as input. When different types of performance data are combined, they should be normalize data and then add together the normalized data to form a single input to the above described methods. In some examples, one type of performance data is given more weight than another should the different types of performance data have different priorities.

Figure 13:
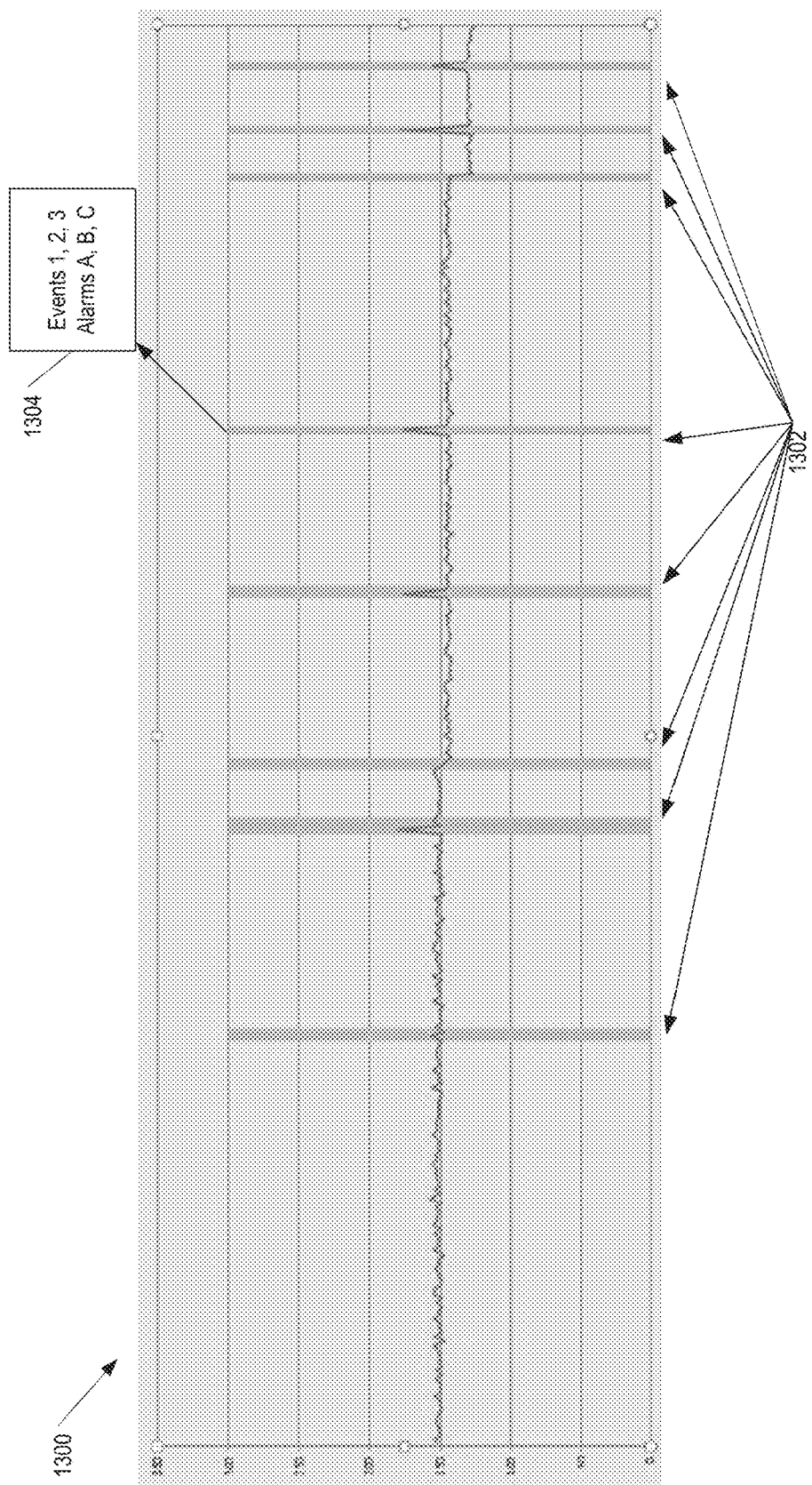
FIG. 13 shows a chart of data points of a performance metric with highlighted regions identifying dramatic changes in examples of the present disclosure.

Performance analyzer 128 provides a number of the highest ranking regions to statistics subsystems 120, which highlights 1302 (FIG. 13) or otherwise visually indicates the regions in a corresponding chart 1300 (FIG. 13) of performance data that is displayed locally or transmitted over a computer network to be displayed remotely. In response to a user request for additional information about a region, statistics subsystems 120 requests events and alarms for the corresponding time period from events and alarms subsystems 124. After events and alarms subsystems 124 provides the events and alarms 1304 (FIG. 13) in the corresponding period, statistics subsystems 120 displays them locally or transmit them over a computer network to be displayed remotely.

From the foregoing, it will be appreciated that various embodiments of the present disclosure have been described herein for purposes of illustration, and that various modifications may be made without departing from the scope and spirit of the present disclosure. For example, user interface 102 may interact with other types of entity managers. Accordingly, the various embodiments disclosed herein are not intended to be limiting, with the true scope and spirit being indicated by the following claims.

We claim:

1. A virtual machine system with improved performance diagnostic for virtual machines, comprising:
   networked host computers running the virtual machines, the virtual machines running applications;
   a virtual machine manager to manage the virtual machines, the virtual machine manager comprising:
      a performance analyzer to provide a plurality of highest ranking regions in a regions list comprising data points of a performance metric for a virtual machine, the performance analyzer comprising:
         a region abstractor to create regions of various time interval in the regions list, each region being a parent, a child, or a neighbor to a number of other regions in the region list;
         a region sorter to sort the regions in the regions list by variance and mean;
         a region pruner, comprising:
            a child-parent region pruner to remove any child region from the regions list when its parent region has a variance that substantially represents the child region; and
            a neighbor region merger to process the regions list after the child-parent region pruner, wherein the neighbor region merger is to replace any two neighboring regions in the regions list with a merged region comprising the two neighboring regions when the merged region has a variance that substantially represents the two neighboring regions;
      a statistics subsystem to:
         collect the data points from the host computers and provide them to the performance analyzer;
         generate a chart of the data points;
         receive the plurality of highest ranking regions in the regions list from the performance analyzer and visually indicate them in the chart;
         display the chart or transmit it over a computer network; and
         display recorded events and recorded alarms corresponding to the plurality of highest ranking regions in the regions list or transmit them over the computer network; and
      an events and alarms subsystem to record events and alarms for the virtual machine and provide the recorded events and the recorded alarms corresponding to the plurality of highest ranking regions in the regions list to the statistics subsystem.

2. The system of claim 1, wherein the region abstractor creates the regions by:
   creating a first region with its mean and variance based on a data list and adding the first region to the regions list;
   splitting the data list into left and right data lists;
   when the left data list is not less than a first minimum time interval, creating a second region with its mean and variance based on the left data list and adding the second region to the regions list;
   when the left data list is less than the first minimum time interval and the right data list is not less than a second minimum time interval, creating a third region with its mean and variance based on the right data list and adding the third region to the regions list; and
   when the left data list is less than the first minimum time interval, the right data list is less than the second minimum time interval, but another right data list at a higher level is not less than the second minimum time interval, creating a fourth region with its mean and variance based on the other right data list and adding the fourth region to the regions list.

3. The system of claim 1, wherein the region sorter sorts the regions in the regions list first by their variance and then any regions with a same variance the region sorter sorts them by their means.

4. The system of claim 1, wherein the child-parent pruner is to:
   when a variance of the child region is smaller than the parent region, remove the child region; and
   when the variance of the parent region is smaller than the child region, remove the child region when a ratio between the variance of the parent region and the variance of the child region is greater than a similarity factor, or otherwise removing the parent region.

5. The system of claim 1, wherein the neighbor region merger is to:
   determine a ratio of the variance of the merged region to a higher of two variances of the two neighboring regions;
   when the ratio is greater than a merge factor:
      set the variance of the merged region equal to the higher variance;
      remove one of the two neighboring regions having the higher variance; and
      replace the other of the two neighboring regions with the merged region.

6. The system of claim 1, wherein the region pruner further comprises an intersection region merger to process the regions list after the neighbor region merger, the intersection region merger is to replace any two intersecting regions with a merged region comprising the two intersecting regions when the merged region has a variance that substantially represents the two intersecting regions.

7. The system of claim 6, wherein the intersection region merger is to:
   determine a ratio of the variance of the merged region to a higher of two variances of the two intersecting regions;
   when the ratio is greater than a merge factor:
      set the variance of the merged region equal to the higher variance;

remove one of the two intersecting regions having the higher variance; and replace the other of the two intersecting regions with the merged region; and when the ratio is not greater than a threshold, removing the other of the two interesting regions.

8. The system of claim 6, wherein the region pruner further comprises an intersection region pruner to process the regions list after the intersection region merger, the intersection region pruner is to remove any region that has a variance less than another region when the region is a child or parent of the other region or the region intersects the other region.

9. The system of claim 8, wherein the region pruner further comprises a region shrinker to process the regions list after the intersection region pruner, the region shrinker is to remove data points at ends of any region when a new slope fitted to remaining data points in the region without the removed data points is greater than or equal to an old slope fitted to original data points in the region including the removed points.

10. The system of claim 9, wherein the region pruner further comprises a region feeder to process the regions list after the region shrinker, the region feeder is to add one or more points to start or end of any region when a ratio of a new variance of the region with the added data points to an old variance of the region without the added points is greater than a merge factor.

* * * * *